United States Patent
Poornachandran et al.

(10) Patent No.: US 10,230,780 B2
(45) Date of Patent: Mar. 12, 2019

(54) METHODS AND APPARATUS FOR COLLABORATIVE CONTENT RENDERING

(71) Applicant: Intel Corporation, Santa Clara, CA (US)

(72) Inventors: Rajesh Poornachandran, Portland, OR (US); Rajneesh Chowdhury, Portland, OR (US); Karthik Veeramani, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 135 days.

(21) Appl. No.: 15/392,872

(22) Filed: Dec. 28, 2016

(65) Prior Publication Data

US 2018/0183847 A1 Jun. 28, 2018

(51) Int. Cl.
*H04L 29/06* (2006.01)
*H04L 29/08* (2006.01)

(52) U.S. Cl.
CPC ............ *H04L 65/601* (2013.01); *H04L 67/16* (2013.01); *H04L 67/18* (2013.01); *H04L 67/327* (2013.01); *H04L 67/36* (2013.01)

(58) Field of Classification Search
CPC .................... H04L 65/601; H04L 67/1097
See application file for complete search history.

(56) References Cited

U.S. PATENT DOCUMENTS

| 8,412,798 B1* | 4/2013 | Wang .................. H04L 67/06 709/217 |
| 2008/0216125 A1 | 9/2008 | Li et al. |
| 2009/0231415 A1 | 9/2009 | Moore et al. |
| 2010/0061294 A1* | 3/2010 | Proctor, Jr. .......... H04W 4/029 370/328 |

(Continued)

FOREIGN PATENT DOCUMENTS

| WO | 2010093831 | 8/2010 |
| WO | 2013028202 | 2/2013 |
| WO | 2014209266 | 12/2014 |

OTHER PUBLICATIONS

International Searching Authority, "International Search Report and Written Opinion," issued in connection with International Patent Application No. PCT/US2017/060839, dated Jan. 31, 2018, 11 pages.

(Continued)

*Primary Examiner* — Davoud A Zand
(74) *Attorney, Agent, or Firm* — Hanley, Flight & Zimmerman, LLC

(57) ABSTRACT

Methods and apparatus for collaborative content rendering are disclosed. From a first device, the rendering capabilities of one or more devices that are within a proximity to the first device are determined, at least one of the one or more devices is identified that supports a delivery of first content that is not natively supported by the first device, and the delivery of the first content is initiated from the at least one of the one or more devices to the first device. The initiation (Continued)

of the delivery of the first content includes a negotiation of characteristics of content presentation and quality level of rendering capabilities. The first content that is received from the at least one of the one or more devices is rendered at the same time as second content that is natively supported by the first device.

20 Claims, 13 Drawing Sheets

(56) References Cited

U.S. PATENT DOCUMENTS

| | | | | |
|---|---|---|---|---|
| 2013/0311986 | A1* | 11/2013 | Arrouye | G06F 8/61 717/175 |
| 2014/0033269 | A1 | 1/2014 | Poornachandran et al. | |
| 2015/0319479 | A1* | 11/2015 | Mishra | G06Q 30/0277 725/32 |
| 2016/0018886 | A1* | 1/2016 | Song | G06F 3/011 715/757 |
| 2016/0048775 | A1* | 2/2016 | Zibell | G06Q 10/02 705/5 |
| 2016/0149969 | A1 | 5/2016 | Farmer et al. | |
| 2017/0272491 | A1* | 9/2017 | Ortiz | H04L 67/1095 |

OTHER PUBLICATIONS

Chris Hoffman, "Wireless Display Standards Explained: AirPlay, Miracast, WiDi, Chromecast, and DLNA," How-To Geek, http://www.howtogeek.com/177145/wireless-display-standards-explained-airplay-miracast-widi-chromecast-and-dlna/, Dec. 4, 2013, 5 pages.
Dell, "Dell UltraSharp 24 Wireless Connect Monitor, U2417HWi," http://www.dell.com/ae/business/p/dell-u2417hwi-monitor/pd, retrieved on Oct. 5, 2016, 2 pages.
Rachel King, "CES 2016: Dell unveils wireless displays for simultaneous Windows, Android use," ZDNET, http://www.zdnet.com/article/ces-2016-dell-keynote-pc-hardware/, Jan. 6, 2016, 5 pages.

* cited by examiner

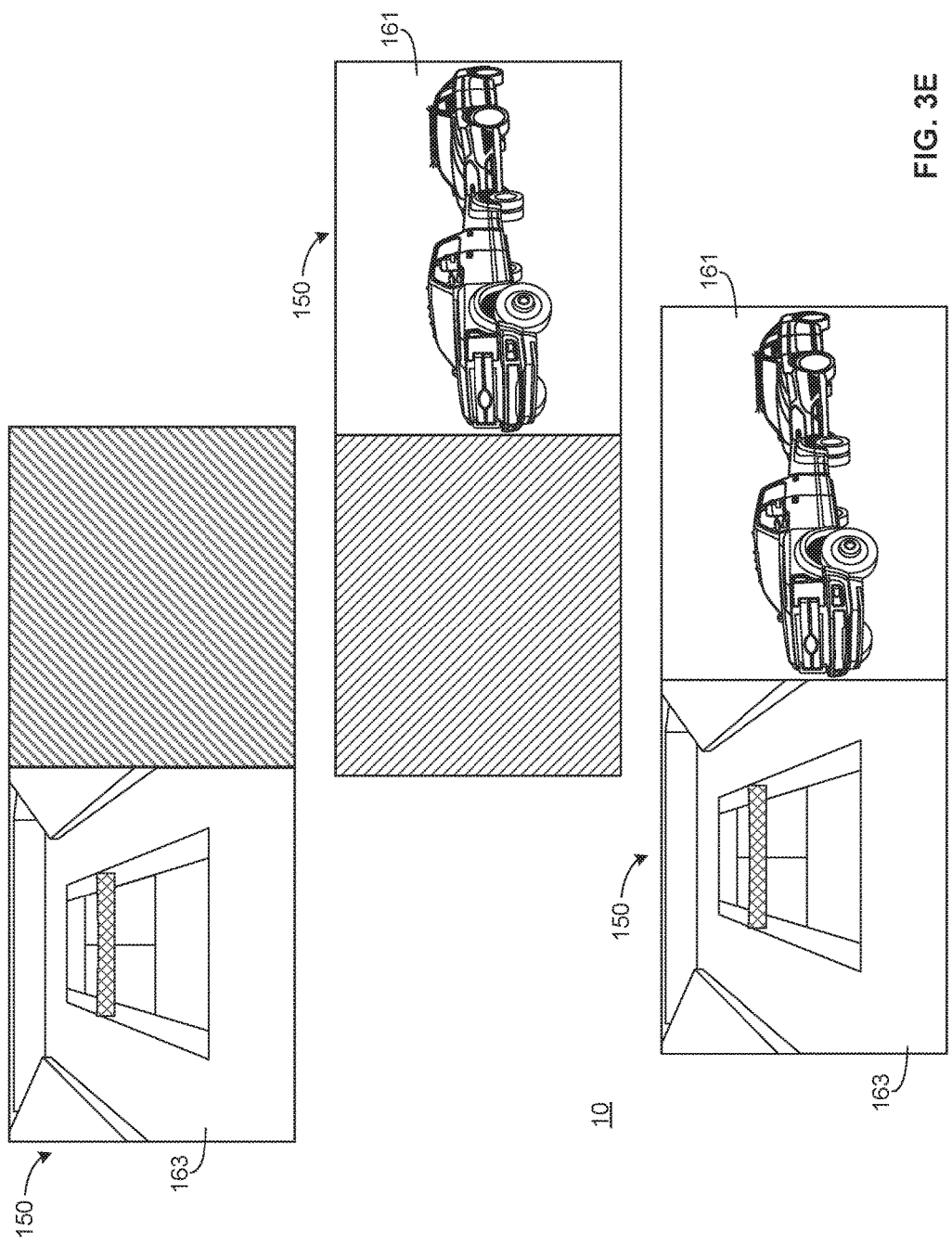

METHODS AND APPARATUS FOR COLLABORATIVE CONTENT RENDERING

FIELD OF THE DISCLOSURE

This disclosure relates generally to wireless display systems and, more particularly, to methods and apparatus for collaborative content rendering.

BACKGROUND

Home wireless display technologies use wireless fidelity (WiFi) to output video that is received via a wireless display (WiDi) or Miracast compatible device and displayed by a monitor. Most modern devices are compatible with WiDi technology. Many-to-one wireless display technologies are a type of wireless display technology and are based on a many-to-one approach. Using a many transmitters-to-one-receiver approach, a wireless display can mirror content displayed from multiple devices such as a laptop and a phone together on the wireless display. In general, many-to-one wireless display technologies enable a plurality of devices to wirelessly transmit content to a single display.

BRIEF DESCRIPTION OF THE DRAWINGS

FIG. 3E illustrates the presentation of a wirelessly received audiovisual stream side by side with the locally supplied audiovisual stream according to one example.

Figure 1:
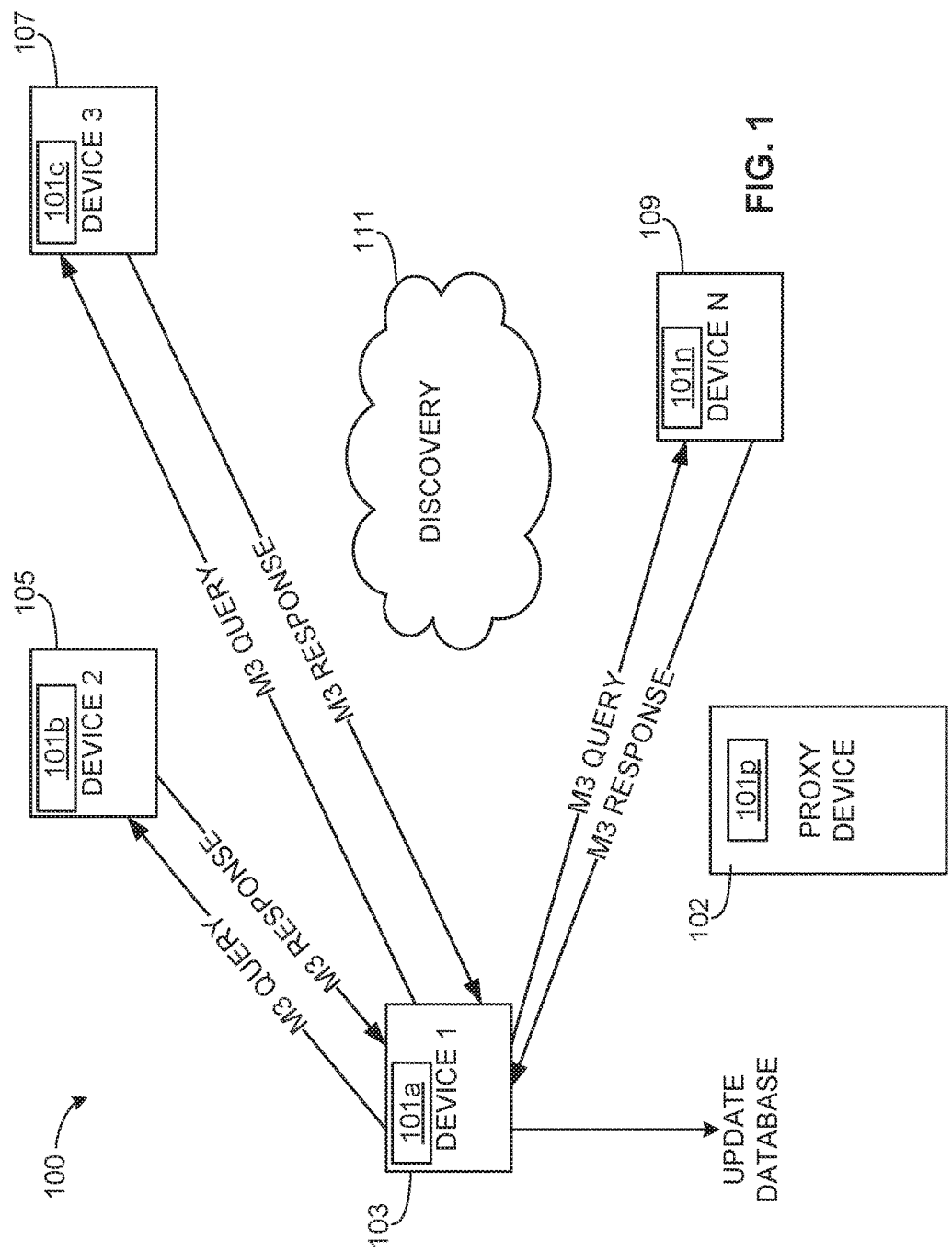
FIG. 1 shows an example operating environment of a collaborative content renderer.

Although example inventions have been disclosed herein, such inventions are not intended to be limited to the specific forms set forth herein. On the contrary, examples disclosed herein are intended to cover such alternatives, modifications, and equivalents as can be reasonably included within the scope of the inventions as defined by the appended claims.

DETAILED DESCRIPTION

In the following detailed description, numerous specific details such as specific method orders, structures, elements, and connections have been set forth. It is to be understood however that these and other specific details need not be utilized to practice examples disclosed herein. In other circumstances, well-known structures, elements, or connections have been omitted, and/or have not been described in particular detail in order to avoid unnecessarily obscuring of examples disclosed herein.

References within the specification to "one example" or "an example" are intended to indicate that a particular feature, structure, or characteristic described in connection with the example is included in at least one example of the present invention. The appearance of the phrase "in one example" in various places within the specification are not necessarily all referring to the same example, nor are separate or alternative examples mutually exclusive of other examples. Moreover, various features are described which may be exhibited by some examples and not by others. Similarly, various requirements are described which may be requirements for some examples but not other examples.

Some portions of the detailed descriptions, which follow, are presented in terms of procedures, steps, logic blocks, processing, and other symbolic representations of operations on data bits within a computer memory. These descriptions and representations are examples used by those skilled in the data processing arts to effectively convey the substance of their work to others skilled in the art. A procedure, computer executed step, logic block, process, etc., is here, and generally, conceived to be a sequence of steps or instructions leading to a desired result. The steps are those requiring physical manipulations of physical quantities. Usually, these quantities are capable of being stored, transferred, combined, compared, and otherwise manipulated in a computer system. It has proven convenient at times, principally for reasons of common usage, to refer to these signals as bits, values, elements, symbols, characters, terms, numbers, or the like.

Existing many-to-one wireless display systems and standards do not enable a transceiver of a set of transceivers to use capabilities of other transceivers in the (e.g., networked) set of transceivers for collaborative rendering of content (where each transceiver is capable of receiving and transmitting content for collaboration purposes). Example methods for collaborative content rendering that addresses these shortcomings are disclosed herein. However, examples disclosed herein are not limited to implementations that solve any or all of the aforementioned shortcomings. As a part of an example method, at a first device, the capabilities of one or more devices that are located within a proximity to the first device are determined, at least one of the one or more devices is identified that can support a delivery of specified content, and from the first device, the delivery of the specified content is initiated. At the first device, the specified content that is received from the at least one of the one or more devices, is rendered adjacent to content that is supplied from the first device. Such collaborative content rendering expands the media capabilities that are accessible by users of neighboring devices beyond that which can be provided by their own individual device. As used herein, the term "neighboring devices" refers to devices that participate in collaborative content rendering that are located within a particular proximity of a device and/or are logically associated with the device and may provide/request collaborative content rendering support.

FIG. 1 shows an example operating environment 100 in which a number of collaborative content renderers 101a, 101b, 101c and 101n may operate. The example collaborative content renderers 101a-101n support the operation of electronic "devices," (e.g., tablet, smartphone, laptop computer, desktop computer) as (a) both transmitters and receivers of partially rendered content and (b) as presenters of blended or composite content. As a part of the example operation of the collaborative content renderers 101a-101n, each device of a group of neighboring devices 103, 105, 107 and 109, participating in collaborative content rendering, is enabled to take advantage of the media capabilities that other devices in the group of devices 103, 105, 107 and 109 can provide. In contrast to known systems, systems described herein facilitate collaborative content rendering among neighboring devices. Collaborative content rendering expands the media capabilities that are accessible to users of the devices 103, 105, 107, 109, beyond media that can be provided by their own device, operating alone and without the benefit of collaboration from participating neighboring devices in Miracast are other suitable many-to-one wireless display scenarios.

In the example of FIG. 1, the example operating environment 100 includes device 103, device 105, device 107, device 109 and a discovery protocol 111. Each device 103, 105, 107 and 109 includes a respective collaborative content renderer 101a, 101b, 101c and 101n. In some examples, example operating environment includes proxy device 102 and proxy collaborative content renderer 101p (hereinafter "proxy").

Referring to FIG. 1, device 103, device 105, device 107 and device 109 can be electronic devices of various types supporting Miracast/Wireless rendering protocol and many-to-one display scenarios. For example, devices 103, 105, 107 and 109 can include but are not limited to smart phones, tablets, laptops and desktop computers. In some examples, devices 103, 105, 107 and 109 participate in collaborative content rendering, and can act as both transmitters and receivers of content, e.g., a transceiver, at any given instant.

In some examples, each device 103, 105, 107 and 109 can connect with one or more other devices 103, 105, 107 and 109 using a network protocol, such as Miracast. In some examples, each device connects with one or more other neighboring devices using a protocol other than Miracast. Thereafter, each device can determine the capabilities of the one or more other neighboring devices using a discovery protocol 111. In one example, the one or more neighboring devices broadcast their availability for collaborative content rendering during a discovery protocol 111 session as described in further detail below in connection with FIGS. 3A-3F. A discovery protocol 111 is used to establish and control media sessions between communicating devices. In one example, the discovery protocol can be a real time streaming protocol (RTSP) discovery protocol. In other examples, other discovery protocols can be used.

In the illustrated example of FIG. 1, each device 103, 105, 107 and 109 that participates in collaborative content rendering, includes a collaborative content renderer 101a-101n.

In one example, collaborative content renderers 101a-101n can comprise software, firmware and/or hardware that is a part of other software, firmware and/or hardware that executes on devices 103, 105, 107 and 109. In other examples, collaborative content renderers 101a-101n can be separate from, but operate cooperatively with, other software, firmware and/or hardware that executes on devices 103, 105, 107 and 109.

As discussed above, collaborative content renderers 101a-101n enable each respective device 103, 105, 107 and 109 to take advantage of capabilities possessed by one or more other devices of the group of neighboring devices. For example, as a part of its operation, the collaborative content renderer 101a, of device 103 (acting as a collaboration requesting device or collaboration requester), determines the media capabilities of one or more of the other devices of the group of neighboring devices that are located within a range (e.g., WiFi direct range, a logical range) of device 103. Thereafter, device 103 identifies at least one of the one or more other devices, for example, device 109 that can support a delivery of specified content. Then, device 103 initiates the delivery of the specified content from device 109 (acting as a collaborating device) to device 103. At device 103 the specified content is blended/composited with locally provided content and presented at the same time, e.g., side by side, picture in picture, etc. In this manner, collaborative content renderers 101a-101n enable each device of the group of devices 103, 105, 107 and 109 to take advantage of the capabilities that other devices in the group of devices can provide. A more detailed description of the operation of collaborative content renderers, 101a-101n, is provided with reference to FIGS. 3A-3F as described in further detail below.

Figure 2:
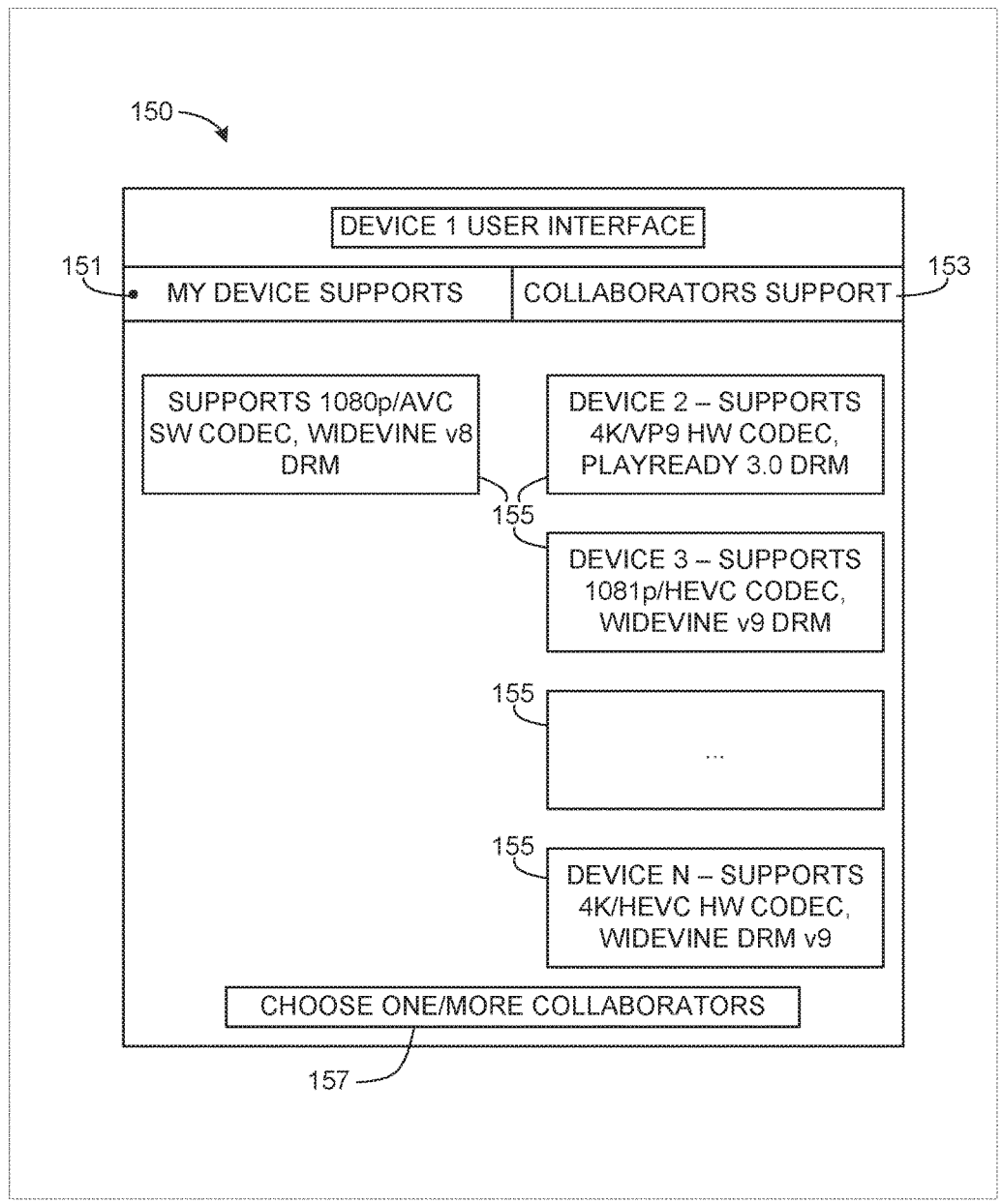
FIG. 2 shows a user interface that can display information that includes user device capabilities and neighboring device capabilities.

In one example, user input associated with collaborative content renderers 101a-101n, can be facilitated by a user interface such as is shown in the illustrated example of FIG. 2. Referring to FIG. 2, user interface 150 is a graphical interface that can be associated with collaborative content renderer 101a according to one example. In the FIG. 2 example, collaborative content renderer 101a resides on device 103. However, in one example, each neighboring device that participates in collaborative content rendering may have an associated user interface. User interface 150 displays information that includes, but is not limited to, user device capabilities 151 and collaborating device capabilities 153 (e.g., a list of capabilities). In one example, media capabilities can include but are not limited to high definition video mode, digital video compression format, codec type and digital rights management. User interface 150 enables users to select specific media capabilities 155 offered by neighboring devices that can enhance their user experience. In one example, collaborators are local (in the same network) and/or are associated with other networks. For example, a user of device 103 can use user interface 150 to identify and select for collaboration, neighboring devices with desired capabilities that are not supported by their own device (see block "Choose One/More Collaborators" 157). As shown in FIG. 2, the specific ultra-premium protected media capabilities (e.g., Netflix™, Hulu™, ESPN™, NFL™, NBA™, etc.) that are possessed by each of the devices that neighbor device 103 (e.g., devices 105 through 109), and that have been discovered by device 103, are depicted in the user interface 150 of device 103. In one example, user interface 150 can be used to establish the wireless connections that are made with neighboring devices. Moreover, user interface 150 can provide a back channel (user input back channel) from which a service that is provided on a neighboring device can be launched. In one example, each device upon which collaborative content renderers 101a-101n reside can have a user interface.

Referring again to FIG. 1, in exemplary examples, collaborative content renderers, 101a-101n, enable collaboration that is configurable and policy based (e.g., based on codec capabilities, protocol compatibilities, security attributes and residual energy of the participating nodes). Moreover, as a part of such collaboration, participating nodes (neighboring devices that participate in collaborative content rendering) are enlisted to perform partial content rendering. For example, content that is not supported on a first device (the collaboration requesting device), but is supported on a second device (the collaborating device) can be accessed and transcoded (partially rendered) at the second device, and then streamed back to the first device for presentation with appropriate policy based encryption as needed (e.g., for ultra-premium protected content using HDCP). As such, the content is partially rendered remotely at the second device (the collaborating device) and then composited/blended locally at the first device (the collaboration requesting device). In one example, partially rendered content can be both sent and received by each participating node (neighboring device). Such transceiver operation enables partially rendered content to be freely shared and composited and/or blended as desired.

In one example, proxy 101p, which has functionality similar to 101a-101n, enables collaboration by remotely executing discovery and/or collaborative content rendering and providing discovery data and/or rendered/partially rendered/composited content to devices 103-109. Thus, in this example, proxy 101p facilitates and/or provides collaboration based on user control (e.g., control from a collaboration requesting device). In one example, proxy 101p can reside on proxy device 102 that can include but is not limited to a server, a set top box, and an electronic device (e.g., computer, laptop, mobile device, etc.). In one example, proxy 101p collects device capabilities of devices within proximity to a collaboration requestor (or other device) and/or itself. In addition, proxy 101p can transmit transcoded/partially rendered/rendered/composited content received from one or more collaborating devices to a collaboration requesting device. In one example, proxy 101p can transcode/partially render/render/composite content received from one or more collaborating devices and transmit the transcoded/partially rendered/rendered/composited content to a collaboration requester. In one example, proxy 101p provides support on a pay as you go basis. In another example, proxy 101p provides free support. In one example, proxy 101p provides unlimited timewise support. In other examples, proxy 101p provides support that is limited timewise. The size of the typical operating environment of proxy 101p can be large (e.g., a large convention center where example proxy 101p is supported by large data center level resources) or small (e.g., a home environment where proxy 101p is a part of an electronic device such as a set top box) or fall somewhere in between.

An advantage of examples, includes, but is not limited to, the operation of participating devices as both transmitters and receivers of content. Unlike examples disclosed herein, conventional many-to-one systems allow devices to be either transmitters or receivers, but not both. Moreover, conventional systems don't allow the blending or compositing of content that is rendered locally with remotely rendered content (and to present the composite content to a user in a many-to-one Miracast display setup); especially for ultra-premium protected content over miracast communication medium. Collaborative content renderers 101a-101n (and proxy 101p in some examples) address the above described deficiencies of conventional systems by providing a user experience where content is rendered and composited across two or more transceivers dynamically in a heterogeneous configuration.

Operation

FIGS. 3A-3F illustrate operations performed by collaborative content renderers 101a-101n according to one example. These operations, which relate to collaborative content rendering, are only examples. It should be appreciated that other operations not illustrated in FIG. 3 can be performed in accordance with one example. FIGS. 3B-3F show screenshots of example interface graphics presented in user interface 150 as a part of collaborative content rendering operations. The operational flow, described below, consists of two stages: (1) device and capabilities discovery, and, (2) collaborative rendering.

Device and Capabilities Discovery

Figure 3A:
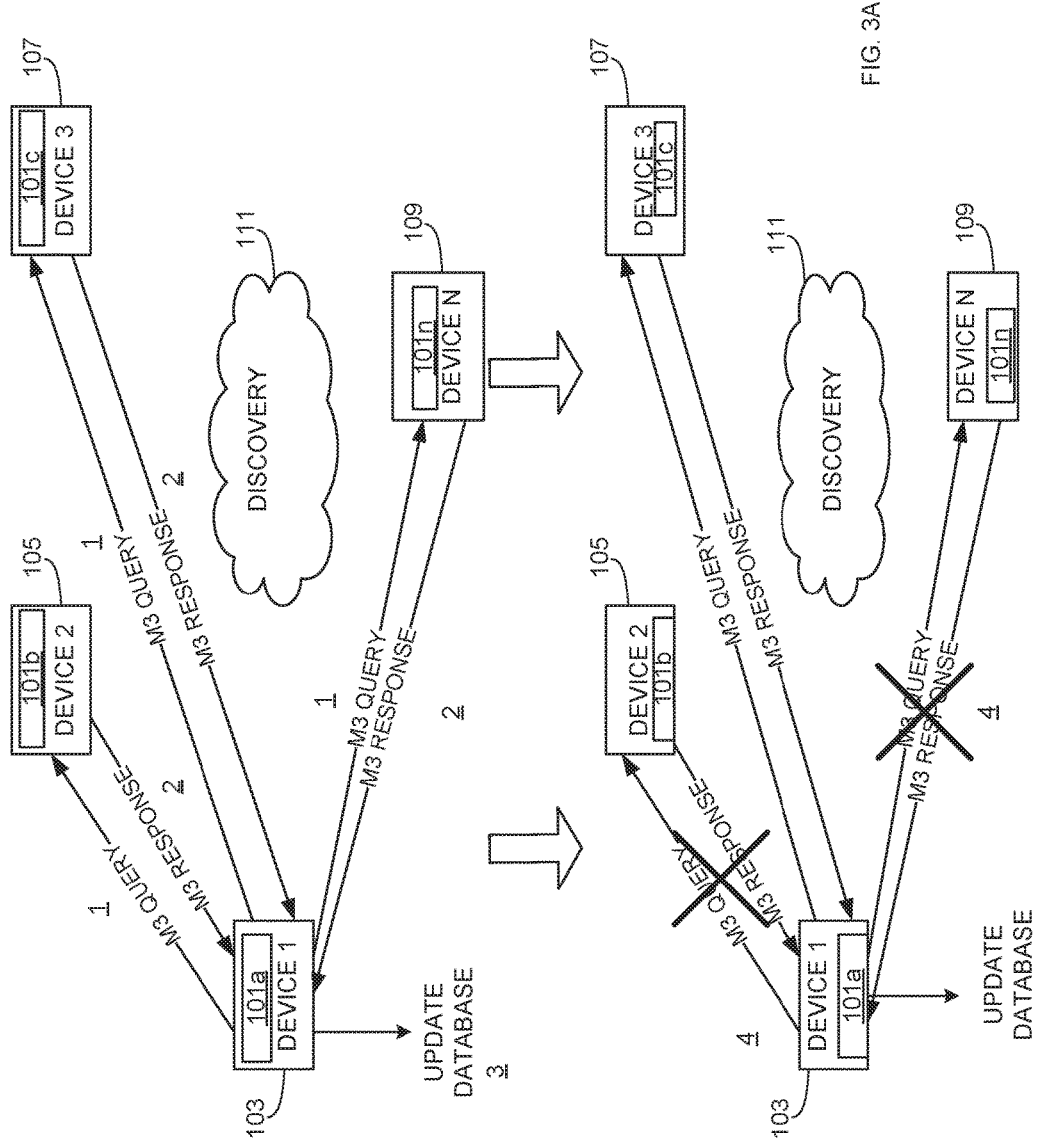
FIG. 3A illustrates example operations performed by collaborative content renderer according to one example.

Referring to FIG. 3A, at 1, in a discovery stage, using a discovery protocol 111, device 103 establishes communication with devices 105 through 109 using a communication protocol. In one example, the establishment of communication with neighboring devices includes establishing a connection with, and terminating a connection with, each of the devices in a serial manner. In other examples, the establishment of communication with neighboring devices can be done in other manners. In one example, devices can establish communication with their neighboring devices using a Miracast protocol. In other examples, devices can establish communication with their neighboring devices using other communication protocols. In one example, each device can use a communication protocol to discover the media capabilities of one or more neighboring devices. In one example, real time streaming protocol (RTSP) is used to discover the media capabilities of one or more neighboring devices. In other examples, other protocols can be used to query neighboring devices' media capabilities. These operations are illustrated in FIG. 3A by the arrows extending between the depicted devices 103 and 109 that represent media capability queries and their corresponding responses. In the FIG. 3A example, media capability discovery activity is focused on queries from, and responses to, device 103. This is because in the FIG. 3A example, device 103, is depicted as acting as the collaboration requesting device or collaboration requester. In one example, media capabilities that are discovered during the discovery stage can include but are not limited to video and audio codec capabilities and digital rights management capabilities (DRM).

In one example, the following tags can be used for discovering the DRM capabilities that are supported natively (e.g., without external support) by a device:

```
wfd-digital-rights-management-support =
"wfd_digital_rights_management_support:" SP drm-spec
    drm-spec = "none" / drm-scheme SP version
    drm-scheme = "Widevine" / "Playready"
    version = DIGIT
```

In other examples, other tags can be used for discovering the DRM capabilities that are natively supported by a device.

Referring again to FIG. 3A, at 2, devices 105 through 109 respond to the media capability queries of device 103 with a list of supported capabilities. For example (see FIG. 2 above), devices 105 through 109 can provide a list of supported capabilities that include capabilities such as codec type (e.g., software, hardware) and DRM capabilities (e.g., scheme version number). In other examples, other supported capabilities can be provided.

At 3, based on the responses received at 2, device 103 updates its local database which maps devices 105 through 109 to their native media capabilities. The database can be accessed subsequent to such updating to locate one or more devices of devices 105 through 109 that have media capabilities that can support media services that are desired (such as the streaming of desired content). In one example, the database resides on device 103. In other examples, the database does not reside on device 103 and is implemented as an off-device database.

At 4, device 103 terminates a connection that it has with the device to which it has been connected and connects with a different device that is located within a distance, and repeats 1 to 3 (the "X" that strikes through queries and responses in FIG. 3A marks the series of connection/termination cycles, that device 103 has had with neighboring devices prior to making a new connection at 4). Referring, to FIG. 3A after connection/termination cycles involving devices 105 and 109 have completed, a connection is established with device 107. In one example, the distance is defined by WiFi direct proximity. In other examples, the distance can be defined in other manners.

In another example, discovery is executed by a proxy 101p (FIG. 1). In one example, proxy 101p collects device capabilities of devices within proximity to a collaboration requestor, e.g., 103 (or other device) and/or itself. The information that is collected by proxy 101p can be stored in the database and made accessible to device 103 (and other devices). It should be appreciated that although a Miracast connection protocol and an RTSP discovery protocol are examples of the type of protocols that can be used to connect to neighboring devices, and, to discover neighboring devices' capabilities, examples are not limited to Miracast and RTSP protocols for such purposes. In one example, other suitable protocols can be used to similar effect.

Collaborative Operation

Figure 3B:
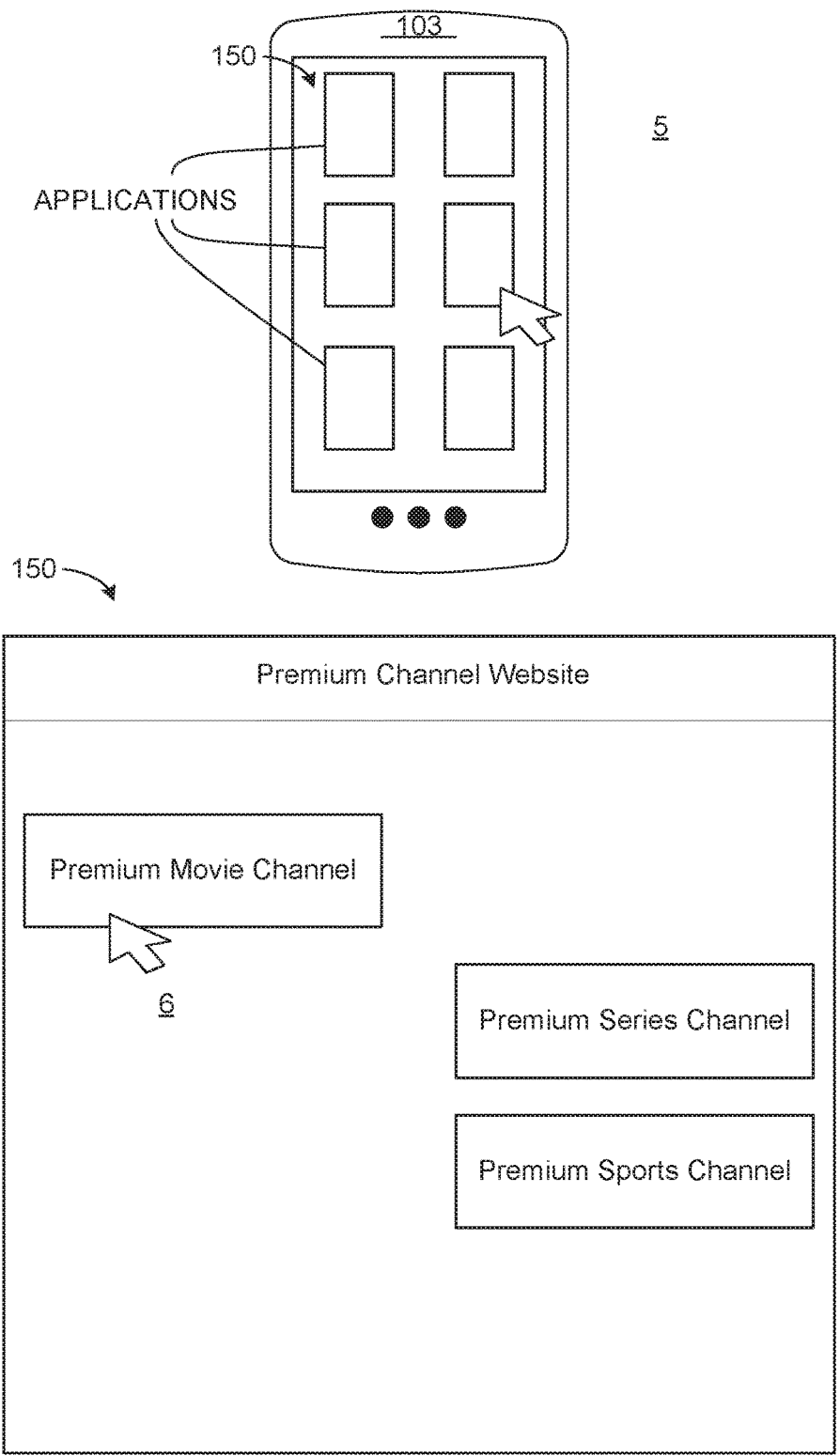
FIG. 3B illustrates a selection of an application to access locally supported content and the use of an application (e.g., browser) to facilitate the selection of locally unsupported content according to one example.
Figure 3C:
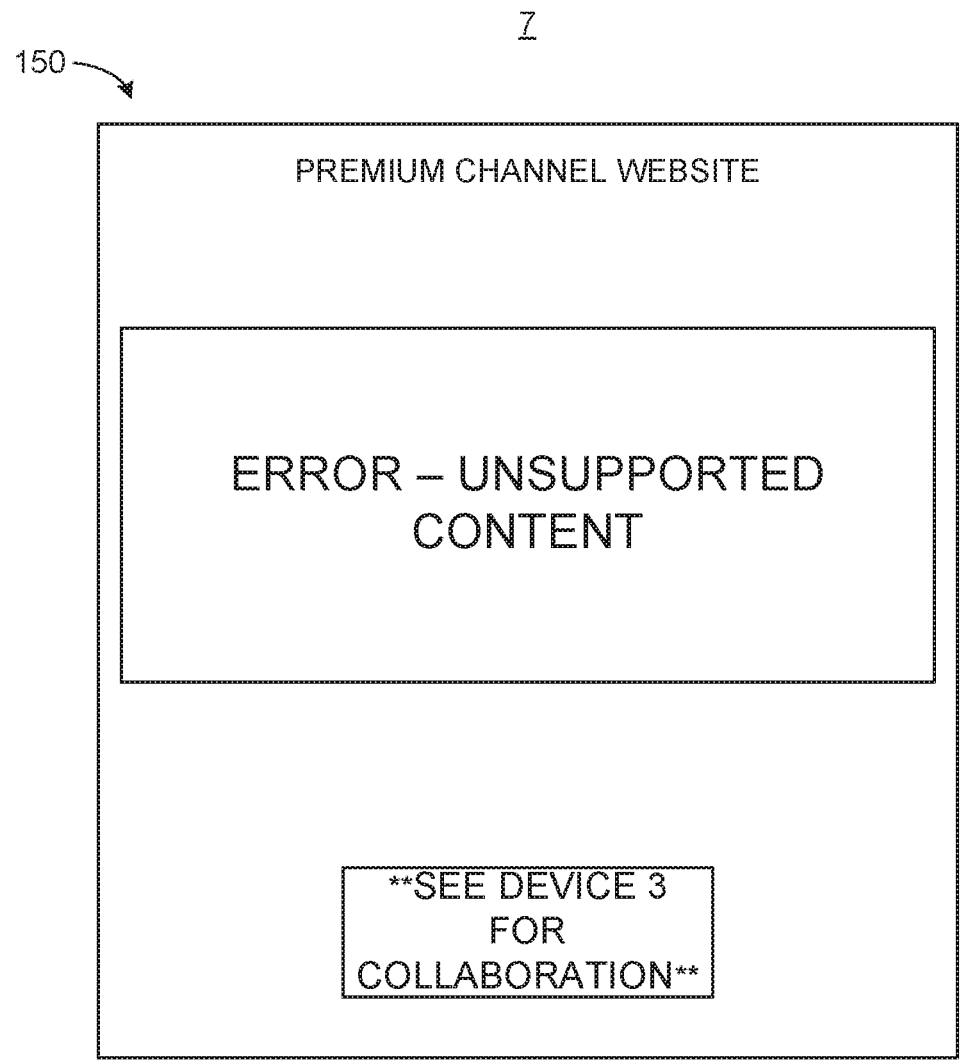
FIG. 3C illustrates the presentation of an error message that indicates that the rendering of content that is desired to be played is not supported and a message that identifies a device that supports the rendering of that content according to one example.

As used herein the term "natively supported" content refers to content that can be played by a device without assistance or collaboration from other devices. As used herein the term "natively unsupported" content refers to content that cannot be played by a device without assistance or collaboration from other devices. As used herein the term "natively unsupported capabilities" refers to capabilities that are not possessed by a device. With respect to a DRM ultra-premium protected content a device that has required credentials provisioned for a specific DRM scheme can only natively support that specific type of content (e.g., NetFlix). Referring to FIG. 3B, at 5, the user of device 103, desiring content that can be rendered by one or more devices 105 through 109 (that cannot be rendered by device 103), in addition to content that can be rendered by device 103, launches an application to stream content that is supported by device 103 (can be played by device 103). Thereafter, referring again to FIG. 3B, at 6, the user uses their application (e.g., browser) to access a website to attempt a stream of the natively unsupported content that is supported by device 107. Referring to FIG. 3C, at 7, because the elicited content is not natively supported by device 103, an error message is displayed, from the application (e.g., browser) based content player, that indicates that the content is not supported and may not be presented. However, based on information in the database of device 103, the user is prompted to enlist the collaboration of device 107 that is indicated to have the capability to play the natively unsupported content (see FIG. 3C at bottom). In one example, where the database does not presently store information related to potential collaborators, the user can initiate discovery operations from interface 150 for purposes of identifying collaborators that have the capability to play the natively unsupported content.

Figure 3D:
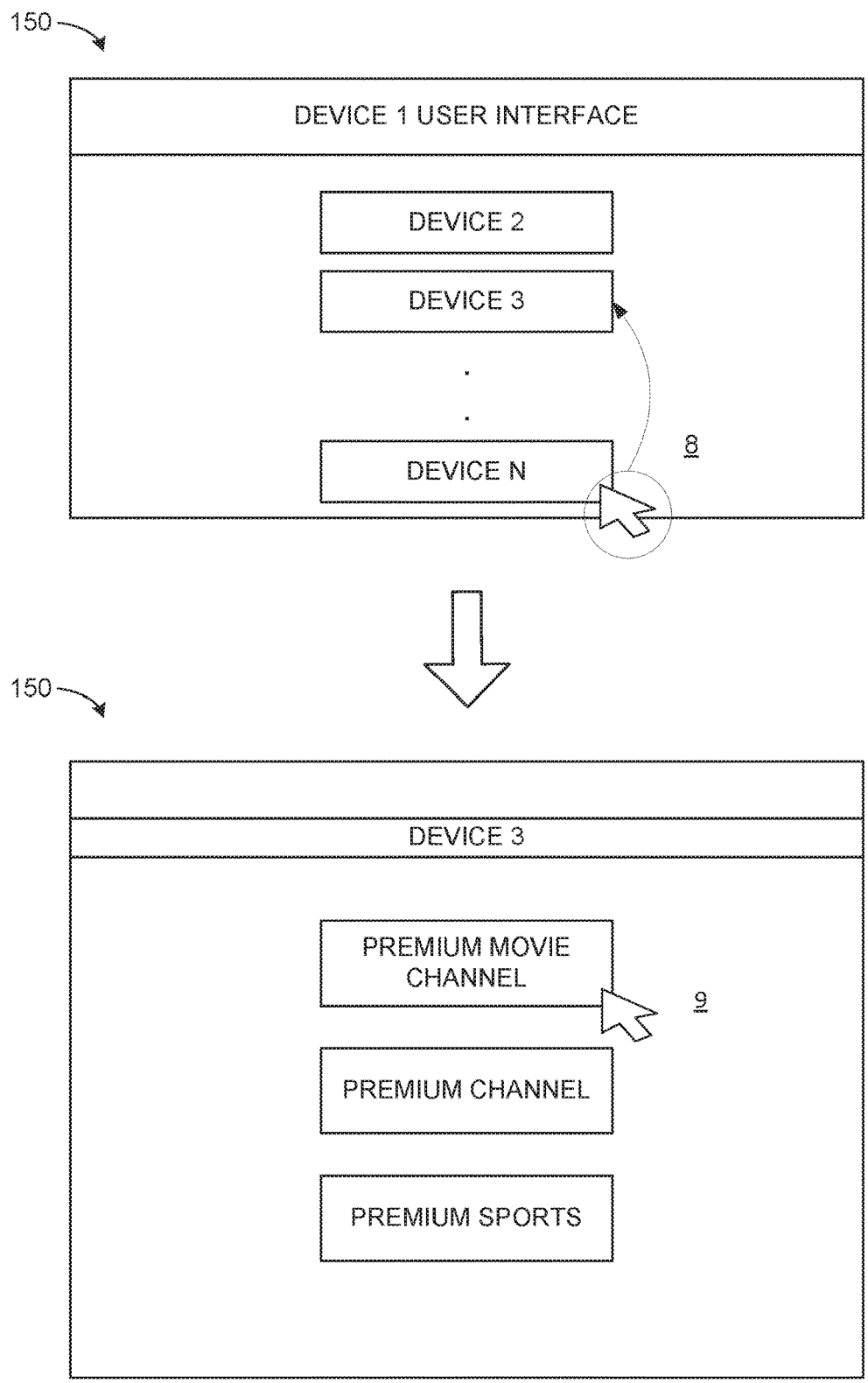
FIG. 3D illustrates the use of a user input back channel to launch content on a neighboring device according to one example.

Referring to FIG. 3D, at 8, the user of device 103 uses the pre-installed user interface 150 on device 103 (acting as the collaboration requesting device) to establish a wireless connection with device 107 (the collaborating device). For example, a wireless connection, with user device 103 operating as the wireless receiver, and device 107 operating as the wireless transmitter. In one example, the user can use user interface 150 to establish a Miracast connection with device 107. In other examples, other connection protocols can be used to establish the connection. Referring again to FIG. 3D, at 9, using a user input back channel, from device 103, the user launches the site, on device 107, that streams the unsupported content (e.g., premium movie channel as shown in FIG. 3D). In response to the user action, device 107 streams the desired content from the cloud, transcodes the content and then sends the content to device 103 as a wireless audiovisual stream with appropriate encryption if mandated by the content provider. In one example, prior to the launch of the site, the user shapes a prospective viewing experience by determining (e.g., negotiating) the display and technical support that is provided by collaborators. For example, as relates to display features, as part of a negotiation for collaboration, the user may indicate specifics regarding the manner in which they would desire the content that is to be delivered to be displayed (e.g., with emphasis and/or focus on, and/or modifications to, specific parts of the displayed content). As relates to technical features, the user may indicate a desired capability to the renderer and the renderer will be able to adjust the content to the capability of the user device (e.g., adjust content to the encryption capability of the user device). In one example, collaborators may indicate that they will not support a requested collaboration (e.g., because sharing the resource has an intolerable effect on the operation of the collaborating device). In such a situation, in one example, the user may offer incentives to the user of the prospective collaborating device, such as monetary or other incentives. In one example, the negotiating may direct a synchronization of collaborating devices when more than one device is providing support (e.g., if as part of a negotiation discovery it is determined that the devices have different resolutions the collaboration requester may direct that that the resolution of the devices be synchronized). In one example, negotiation may occur prior to runtime or after runtime (before or after the start of the delivery of content). In one example, an initiation of the delivery of the first content includes a negotiation of characteristics of content presentation and quality level of rendering capabilities. In one example, negotiation includes identifying a subset of the one or more devices to provide a desired quality level of rendering capabilities. In one example, the negotiation can occur at any time desired by the user. In one example, the negotiation is one of set to automatically occur periodically and to be disabled.

Referring to FIG. 3E, at 10, device 103 renders, on user interface 150, the incoming wireless audiovisual stream 161 (e.g., a movie that includes a car chase from a premium channel) from device 107 side-by-side with the local stream 163 (e.g., a sporting event from a sports channel). As such, collaborative content renderer 101*a* allows the user to view both items of contents on device 103 side-by-side with maximal quality.

Figure 3F:
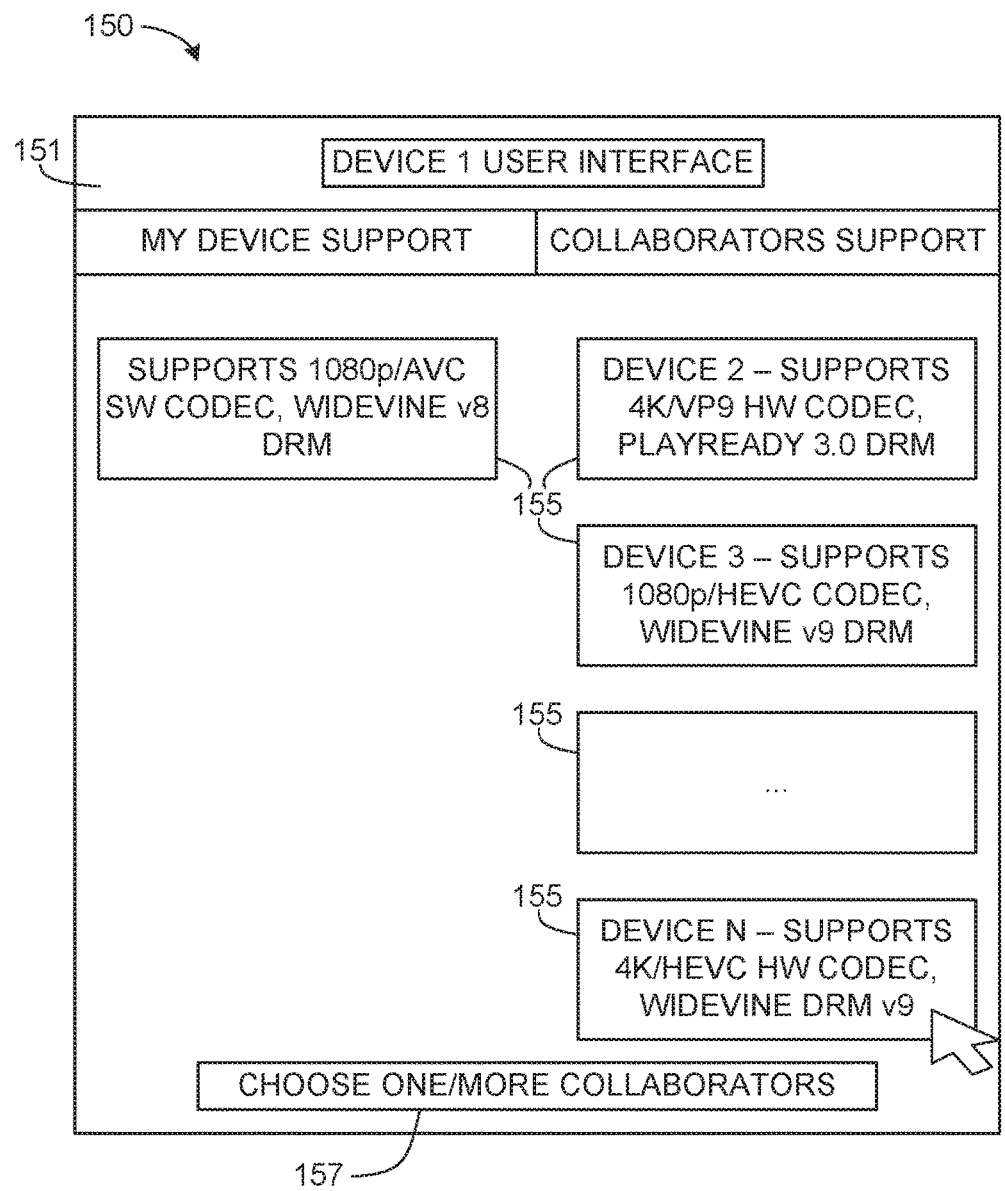
FIG. 3F illustrates a notification of a user of the availability of neighboring devices and their capabilities according to one example.

Referring to FIG. 3F, at 11, if the collaboration of device 107 is discontinued for any reason, collaborative content renderer 101*a* can notify the user of the availability of other neighboring devices with similar capabilities on device 103. The user of device 103 can initiate a collaboration session with another neighboring device by selecting that neighboring device via user interface 150 for collaboration as shown in FIG. 3F.

A real world situation where the above described collaborative rendering could be utilized is where, for example, a user of a tablet device wants to view content such as a live tennis match using a premium sports channel application, that is supported by their tablet, and at the same time, wants to view unsupported content such as one of their favorite movies that is being streamed on a premium movie channel (see FIG. 3E).

In other examples, collaborative rendering can be facilitated by proxy, e.g., 101*p* in FIG. 1. For example, based on user control from device 103, proxy, e.g., 101*p* in FIG. 1 (via proxy device 102 in FIG. 1) can transmit transcoded/partially rendered/rendered/composited content collected from one or more collaborating devices to device 103. In one example, based on control from 103, proxy, e.g., 101*p* in FIG. 1 (via proxy device 102) can transcode/partially render/render/composite content collected from one or more collaborating devices and transmit the transcoded/partially rendered/rendered/composited content to device 103 (a collaboration requesting device).

It should be appreciated that although FIGS. 3A-3F relate to one-to-one collaborative rendering, exemplary examples include many-to-one collaborative rendering. In a many-to-one collaborative rendering session a user device can act as a receiver that hosts several transmitters. The receiver receives audiovisual streams from each transmitter and blends and renders them together alongside local content. Similarly, a device can act as a receiver while simultaneously acting as a transmitter that sends content that a remote device can blend with local content.

Figure 4:
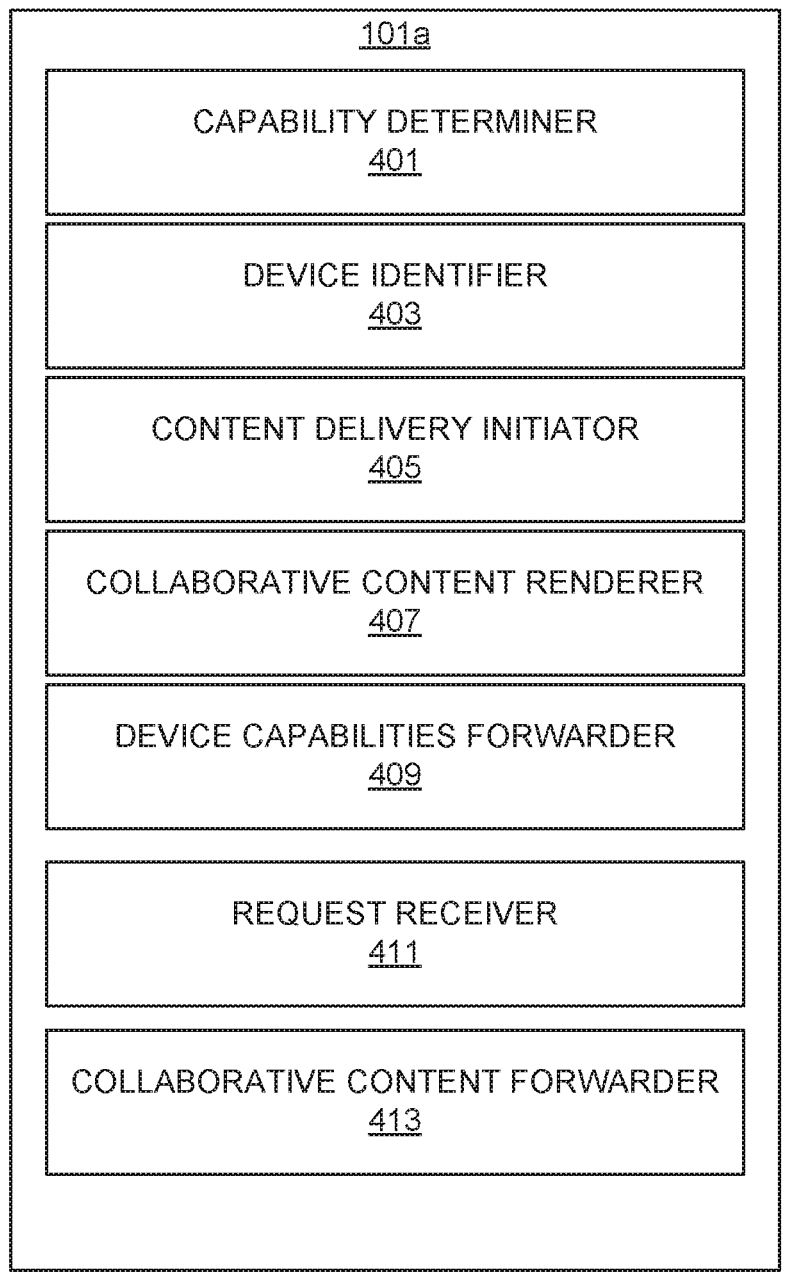
FIG. 4 shows components of a collaborative content renderer according to one example.

FIG. 4 shows components of a collaborative content renderer 101*a* according to one example. In one example, components of collaborative content renderer 101*a* implement an algorithm for collaborative content rendering. In the FIG. 4 example, collaborative content renderer 101 includes capability determiner 401, device identifier 403, content delivery initiator 405, collaborative content renderer 407, device capabilities forwarder 409, request receiver 411 and collaborative content forwarder 413. In one example, collaborative content renderer 101*a* can reside on each electronic device that participates in collaborative content rendering (e.g., device 103 through device 109 shown in FIG. 1). Referring to FIG. 4, further detail of collaborative content renderer 101*a* is shown. Capability determiner 401, from a first device of neighboring devices, determines the capabilities of one or more other devices of the neighboring devices that are located within a proximity (e.g., WiFi direct proximity) to the first device. In one example, capability determiner 401 determines the media capabilities of the one or more other devices using a communication protocol that discovers the media capabilities of the one or more other devices. In particular, capability determiner 401 uses a communication protocol that queries the one or more other devices regarding their media capabilities and receives their responses to the queries. Determining the media capability of the one or more other devices enables the first device to identify neighboring devices that have the capability to process desired content and to deliver the desired content to the first device in a specified format (e.g., at least partially rendered). In one example, the determining includes using a communication protocol to discover natively unsupported digital rights management (DRM) rendering capabilities over a Miracast or other wireless many-to-one display connection.

Device identifier 403 identifies at least one of the one or more other devices that can support the delivery of specified content. In one example, based on the media capabilities of the one or more other devices that are discovered by capability determiner 401, device identifier 403 identifies at least one of the one or more other devices (potential collaborating device(s)) that support the delivery of specified content. The identification of such devices, enables a user to select a device that supports the collaborative rendering of the specified content. In one example, after devices that support the delivery of specified content have been identified, information related to their capabilities can be displayed on a user interface (e.g., 150 in FIG. 2) associated with the user's device.

Content delivery initiator 405 initiates the delivery of the specified content from at least one of the one or more other devices to the first device (e.g., when acting as a collaboration requesting device). In one example, content delivery initiator 405 can be prompted to initiate the delivery of content via a user interface (see user interface 150 in FIG. 2 and in FIG. 3F). Content delivery initiator 405 establishes a connection between the first device and at least one of the one or more other devices using a connection protocol. In one example, the connection establishes the first device as the receiver (the collaboration requesting device) and the at least one of the one or more other devices as the transmitter (collaborating device). In one example, prior to the launch of the site, the user via interface 150 may shape a prospective viewing experience by determining (e.g., negotiating) the display and technical support that is provided by collaborators. For example, as relates to display features, as part of a negotiation for collaboration, the user may indicate specifics regarding the manner in which they would desire the content that is to be delivered to be displayed (e.g., with emphasis and/or focus on, and/or modifications to, specific parts of the displayed content). As relates to technical features, the user may indicate a desired capability to the renderer and the renderer will be able to adjust the content to the capability of the user device (e.g., adjust content to the encryption capability of the user device). In one example, the initiating is prompted from a user interface that is located at the first device and the content includes DRM content that is protected by a trusted execution environment (TEE) with high-bandwidth digital content protection (HDCP).

Collaborative content renderer 407 renders the specified content supplied (e.g., streamed) by the at least one of the one or more other devices side by side with the content that is supplied locally from the first device. In one example, collaborative content renderer 407 receives transcoded content (e.g., partially rendered content) as an audiovisual stream that it presents side-by-side with locally supplied content. In one example, partial rendering capabilities are negotiated during the discovery phase based on how a user wishes to view the content (e.g., side by side as shown in FIG. 3E or as picture-in-picture not shown in figures). In one example, collaborative content renderer 407 supports both one-to-one collaborative rendering sessions and many-to-one collaborative rendering sessions.

Device capabilities forwarder 409 provides access to data that characterizes the media capabilities of a first device of one or more neighboring devices to one or more other devices of the one or more neighboring devices that are located within a proximity (WiFi direct proximity) to the first device. In one example, device capabilities forwarder 409 provides access to data that characterizes the media capabilities of the first device based on a communication protocol that is used to provide access to the device capabilities. In particular, device capabilities forwarder 409 uses a communication protocol that is executed in response to queries from neighboring devices regarding media capabilities. Providing access to the capabilities of the first device enables neighboring devices to determine if the first device can support the delivery of content that is desired by users of the neighboring devices.

Request receiver 411 receives requests from at least one of the neighboring devices for specified content. In one example, the at least one of the neighboring devices seeks collaboration for content that is not natively supported by the at least one of the neighboring devices.

Collaborative content forwarder 413, in response to a request from a neighboring device (e.g., that is acting as a collaboration requesting device), transmits partially rendered content to the neighboring device, from the first device (e.g., when the first device is operating as the collaborating device). In one example, the partially rendered content is transcoded at the first device, based on capabilities of the first device, and then sent to the collaboration requesting device as an audiovisual stream.

It should be appreciated that the aforementioned components of collaborative content renderer 101*a* can be implemented in hardware or software or in a combination of both. In one example, components and operations of collaborative content renderer 101*a* can be encompassed by components and operations of one or more computer components. In another example, components and operations of collaborative content renderer 101*a* can be separate from the aforementioned one or more computer components but can operate cooperatively with components and operations thereof.

While an example manner of implementing the collaborative content renderer of FIG. 1 is illustrated in FIG. 4, one or more of the elements, processes and/or devices illustrated in FIG. 4 may be combined, divided, re-arranged, omitted, eliminated and/or implemented in any other way. Further, the example capability determiner 401, device identifier 403, content delivery initiator 405, collaborative content renderer 407, device capabilities forwarder 409, request receiver 411 and collaborative content forwarder 413 and/or, more generally, the example collaborative content renderer 101 of FIG. 4 may be implemented by hardware, software, firmware and/or any combination of hardware, software and/or firmware. Thus, for example, any of the example components of collaborative content renderer and/or, more generally, the example collaborative content renderer 101 could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example, the example capability determiner 401, device identifier 403, content delivery initiator 405, collaborative content renderer 407, device capabilities forwarder 409, content request receiver 411 and collaborative content forwarder 413 is/are hereby expressly defined to include a tangible computer readable storage device or storage disk such as a memory, a digital versatile disk (DVD), a compact disk (CD), a Blu-ray disk, etc. storing the software and/or firmware. Further still, the example collaborative content renderer 101 of FIG. 1 may include one or more elements, processes and/or devices in addition to, or instead of, those illustrated in FIG. 4, and/or may include more than one of any or all of the illustrated elements, processes and devices.

Figure 5:
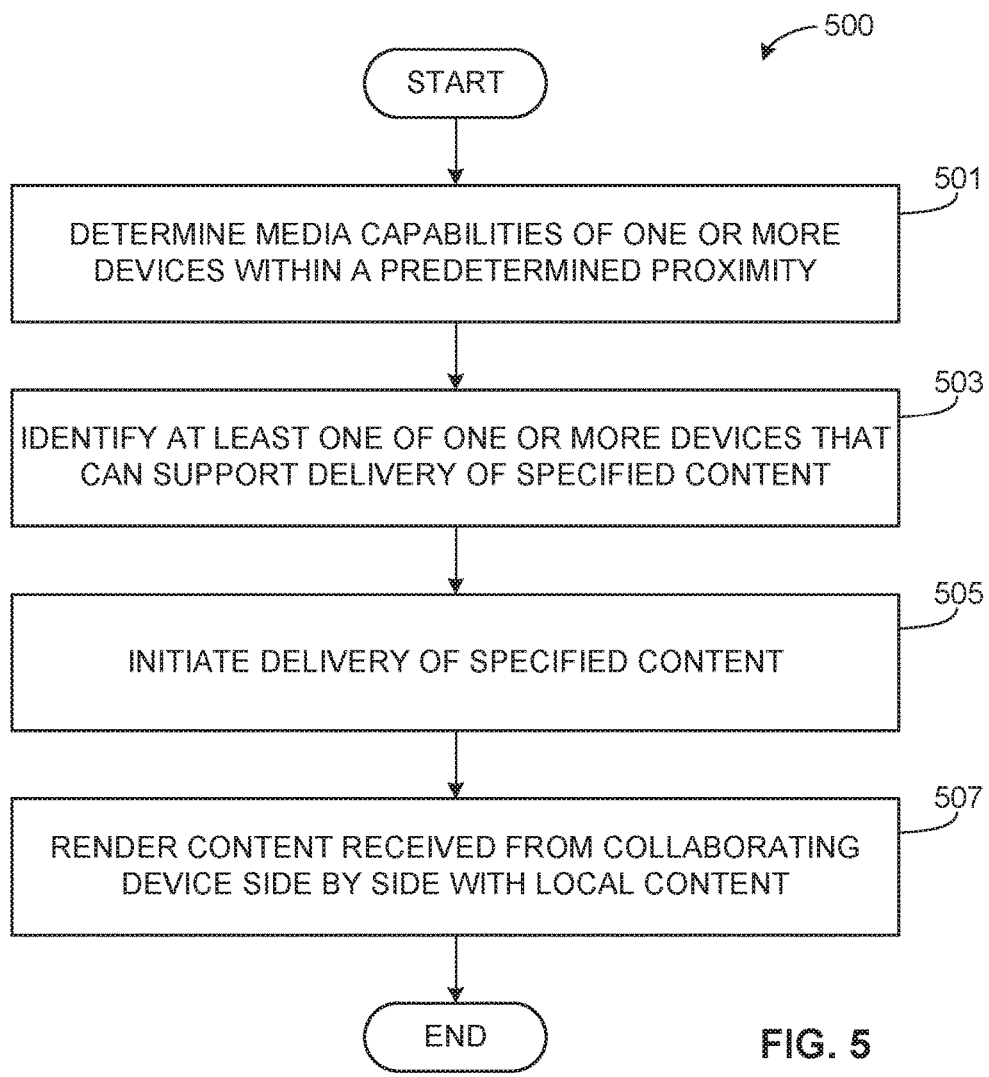
FIG. 5 shows a flowchart representative of example machine readable instructions that may be executed to implement the example method for collaborative content rendering.

A flowchart representative of example machine readable instructions for implementing the collaborative content renderer of FIG. 1 is shown in FIG. 5. In this example, the machine readable instructions comprise a program for execution by a processor such as the processor 812 shown in the example processor platform 800 discussed below in connection with FIG. 8. The program may be embodied in software stored on a tangible computer readable storage medium such as a compact disk read-only memory (CD-ROM), a floppy disk, a hard drive, a digital versatile disk (DVD), a Blu-ray disk, or a memory associated with the processor 812, but the entire program and/or parts thereof could alternatively be executed by a device other than the processor 812 and/or embodied in firmware or dedicated hardware. Further, although the example program is described with reference to the flowchart illustrated in FIG. 5, many other methods of implementing the example collaborative content renderer 101 may alternatively be used. For example, the order of execution of the blocks may be changed, and/or some of the blocks described may be changed, eliminated, or combined.

As mentioned above, the example processes of FIGS. 5-7 may be implemented using coded instructions (e.g., computer and/or machine readable instructions) stored on a tangible computer readable storage medium such as a hard disk drive, a flash memory, a read-only memory (ROM), a compact disk (CD), a digital versatile disk (DVD), a cache, a random-access memory (RAM) and/or any other storage device or storage disk in which information is stored for any duration (e.g., for extended time periods, permanently, for brief instances, for temporarily buffering, and/or for caching of the information). As used herein, the term tangible computer readable storage medium is expressly defined to include any type of computer readable storage device and/or storage disk and to exclude propagating signals and to exclude transmission media. As used herein, "tangible computer readable storage medium" and "tangible machine readable storage medium" are used interchangeably. Additionally or alternatively, the example processes of FIGS. 5-7 may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media. As used herein, when the phrase "at least" is used as the transition term in a preamble of a claim, it is open-ended in the same manner as the term "comprising" is open ended.

FIG. 5 shows a flowchart 500 of a method for collaborative content rendering according to one example. The flowchart includes processes that, in one example can be carried out by processors and electrical components under the control of computer-readable and computer-executable instructions. Although specific steps are disclosed in the flowcharts, such are exemplary. That is the present example is well suited to performing various other steps or variations of the steps recited in the flowchart.

Referring to FIG. 5, capability determiner 401 (FIG. 4), determines at a first device, the media capabilities of one or more devices within a proximity (e.g., WiFi direct proximity) of the first device (block 501). See discussion made in connection with capability determiner 401 in FIG. 4. In one example, as discussed herein a communication protocol is used to query the one or more neighboring devices regarding their media capabilities.

Device identifier 403 (FIG. 4) identifies at least one of the one or more devices that can support a delivery of specified content (block 503) See also discussion made herein in connection with device identifier 403 in FIG. 4. In one example, the at least one of the one or more devices can be identified by referencing a database that stores data that characterizes the media capability of neighboring devices.

Content delivery initiator 405 (FIG. 4) initiates, from the first device, the delivery of the specified content, from the at least one of the one or more devices, to the first device (block 505). See discussion made herein in connection with content delivery initiator 405 in FIG. 4. In one example, a user can initiate the delivery of content (such as by streaming) via a user interface. In one example, the specified content is partially rendered on the at least one of the one or more devices before it is delivered to the first device. In one example, prior to the launch of the site, the user via interface 150 (FIG. 2) may shape a prospective viewing experience by determining (e.g., negotiating) the display and technical support that is provided by collaborators. For example, as relates to display features, as part of a negotiation for collaboration, the user may indicate specifics regarding the manner in which they would desire the content that is to be delivered to be displayed (e.g., with emphasis and/or focus on, and/or modifications to, specific parts of the displayed content). As relates to technical features, the user may indicate a desired capability to the renderer and the renderer will be able to adjust the content to the capability of the user device (e.g., adjust content to the encryption capability of the user device).

Collaborative content renderer 407 (FIG. 4) renders at the first device, partially rendered specified content received from the at least one of the one or more devices (the collaborating device) with content that is supplied locally from the first device, e.g., side by side, picture-in-picture, etc. (block 507). In one example, rendering partially rendered specified content received from the at least one of the one or more devices with content that is supplied locally, is doable in any user configurable multi-content rendering manner, e.g., while expanding one of the content portions to view an event of interest (e.g., a touchdown). See discussion made in connection with collaborative content renderer 407 in FIG. 4.

Figure 6:
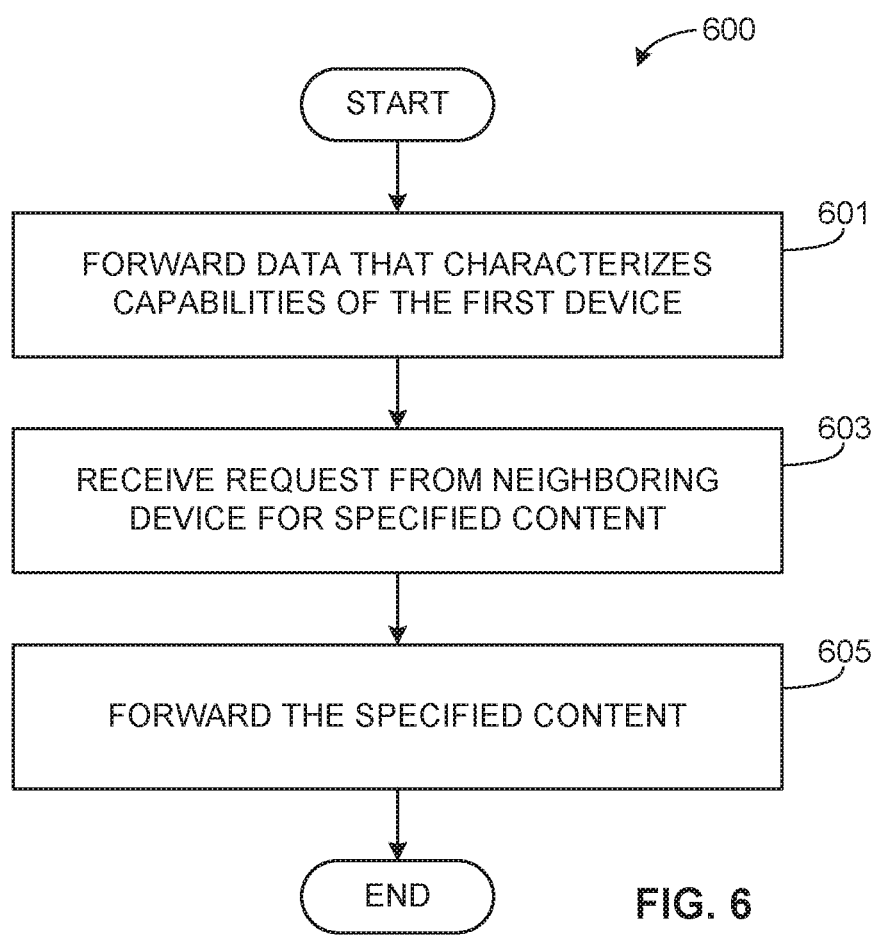
FIG. 6 shows a flowchart representative of example machine readable instructions that may be executed to implement the example method for forwarding content for collaborative content rendering.

FIG. 6 shows a flowchart 600 of a method for forwarding content for collaborative content rendering according to one example.

Device capabilities forwarder 409 (FIG. 4) forwards from the first device, data that characterizes capabilities of the first device to one or more neighboring devices located within a proximity (e.g., WiFi direct proximity) of the first device (block 601). See discussion made herein in connection with device capabilities forwarder 409 in FIG. 4. In one example, the first device forwards data to one or more neighboring devices that characterizes the capabilities of the first device in response to one or more query messages from at least one of the one or more neighboring devices.

Request receiver 411 (FIG. 4) receives a request from at least one of the one or more neighboring devices (acting as a collaboration requesting device), for specified content, that can be partially rendered using capabilities of the first device (block 603). See discussion made herein in connection with content request receiver 411 in FIG. 4. And, Collaborative content forwarder 413 (FIG. 4) from the first device (acting as the collaborating device), forwards the specified content to the at least one of the one or more neighboring devices (block 605). See discussion made herein in connection with collaborative content forwarder 413 in FIG. 4. In one example, the content is transcoded at the first device before it is sent to the at least one device from which the request is made.

Figure 7:
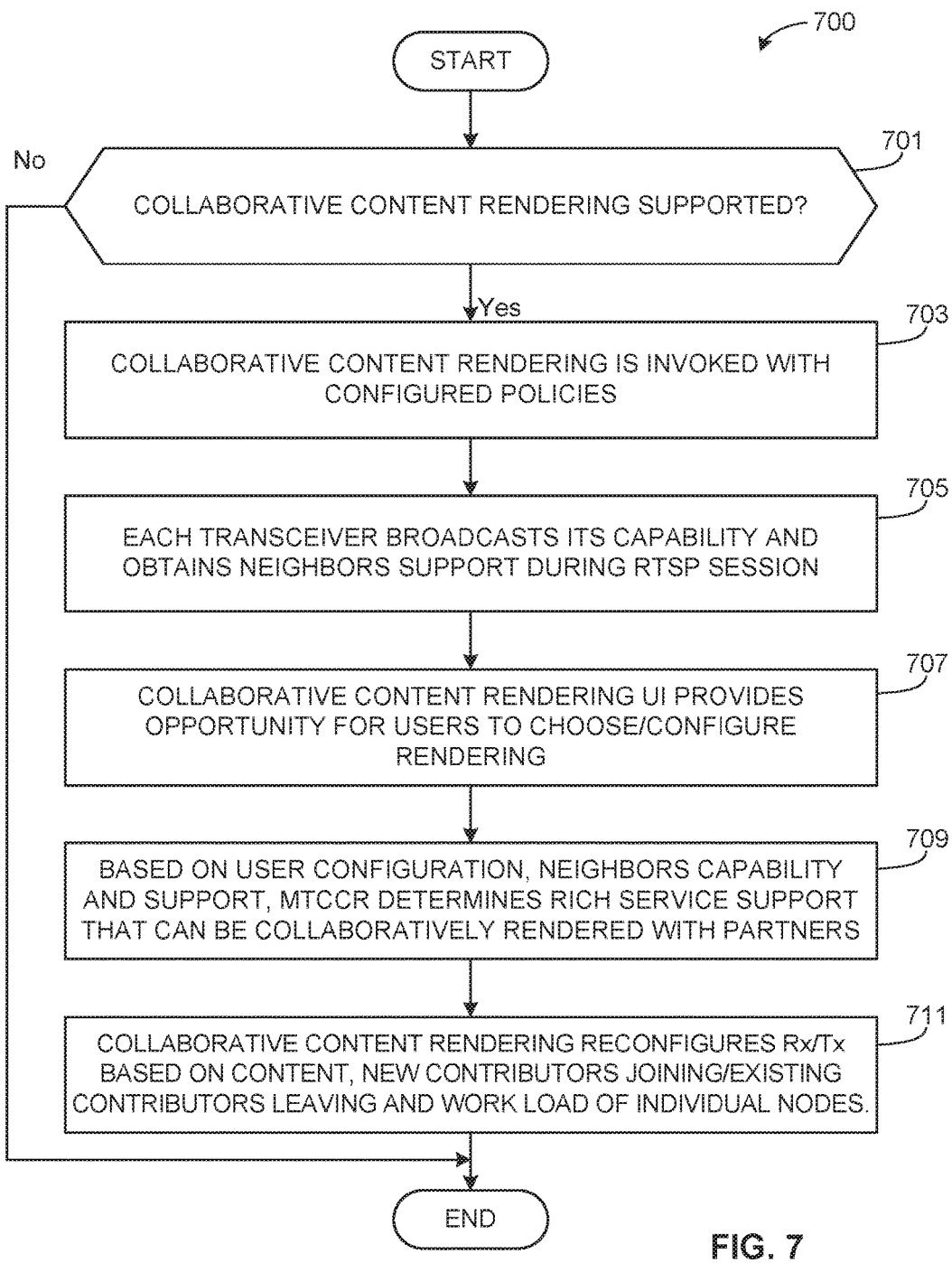
FIG. 7 is a flowchart representative of example machine readable instructions that may be executed to implement aspects of a method for transceiver collaborative content rendering according to one example.

FIG. 7 is a flowchart 700 of aspects of the operational flow of a method for transceiver collaborative content rendering according to one example. Capability determiner 401 (FIG. 4) determines if collaborative content rendering is supported by one or more devices in a group of neighboring devices (block 701). Collaborative content renderer 407 (FIG. 4) invokes collaborative content rendering with configured policies (block 703). In one example, rendered content is protected with encryption that is mandated by a content provider while being shared with a collaboration requestor. Capability determiner 401 (FIG. 4) receives from each participating device in a group of neighboring devices, acting as transceivers, broadcasts of their capability and obtains neighbor device support data (e.g., capabilities data) during an RTSP session (block 705). In other examples, a different communication protocol can be used to obtain neighbor device support data. Collaborative content renderer 407 (FIG. 4) presents a collaborative content rendering user interface (UI) that provides the opportunity for users to choose/configure rendering (e.g., choose one or more collaborators that can provide the capabilities involved in supporting a desired collaborative rendering of content) (block 707). Capability determiner 401 (FIG. 4) determines based on user configuration and neighbor capability and support, service support for collaborative content rendering (block 709). Capability determiner 401 (FIG. 4) prompts content collaborators to reconfigure transceiving based on desired content rendering collaborations, new contributors joining, existing contributors leaving and work load of individual nodes (block 711).

Figure 8:
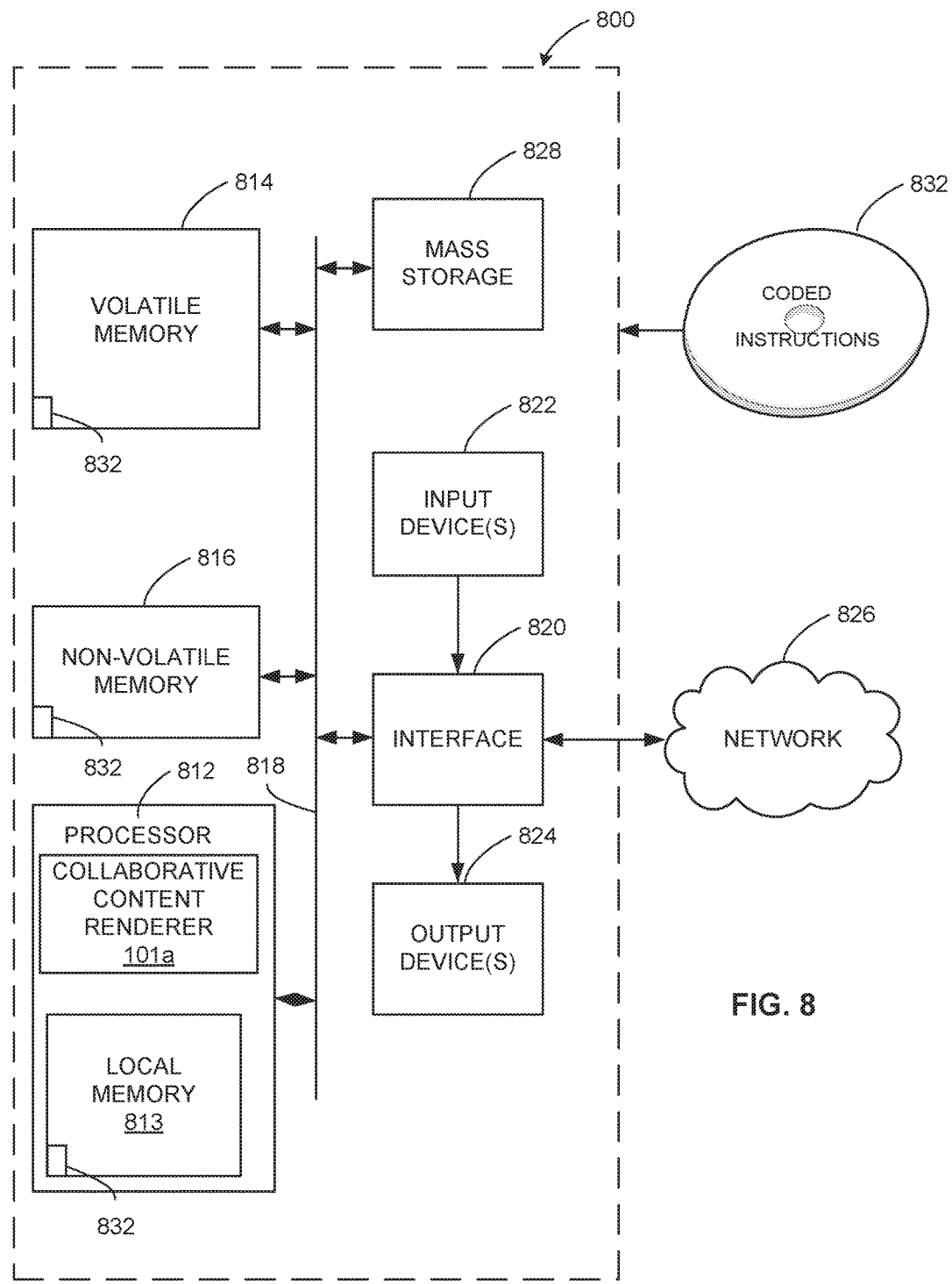
FIG. 8 is a block diagram of an example processor platform that may execute machine-readable instructions of FIGS. 5-7 to implement the transceiver content collaboration rendering according to one example.

FIG. 8 is a block diagram of an example processor platform 600 capable of executing the instructions of FIGS. 5 through 7 to implement the apparatus of FIG. 1. The processor platform 800 can be, for example, a server, a personal computer, a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, or any other type of computing device.

The processor platform 800 of the illustrated example includes a processor 812. The processor 812 of the illustrated example is hardware. For example, the processor 812 can be implemented by one or more integrated circuits, logic circuits, microprocessors or controllers from any desired family or manufacturer.

The processor 812 of the illustrated example includes a local memory 813 (e.g., a cache). The processor 812 of the illustrated example is in communication with a main memory including a volatile memory 814 and a non-volatile memory 816 via a bus 818. The volatile memory 814 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 816 may be implemented by flash memory and/or any other desired type of memory device. Access to the main memory 814, 816 is controlled by a memory controller.

In one example, collaborative content renderer 101a can be included as a part of processor 812. In one example, collaborative content renderer 101a can be constituted by circuitry that implements an algorithm for collaborative content rendering.

The processor platform 800 of the illustrated example also includes an interface circuit 820. The interface circuit 820 may be implemented by any type of interface standard, such as an Ethernet interface, a universal serial bus (USB), and/or a peripheral component interconnect (PCI) express interface.

In the illustrated example, one or more input devices 822 are connected to the interface circuit 820. The input device(s) 822 permit(s) a user to enter data and commands into the processor 812. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 824 are also connected to the interface circuit 820 of the illustrated example. The output devices 824 can be implemented, for example, by display devices (e.g., a light emitting diode (LED), an organic light emitting diode (OLED), a liquid crystal display, a cathode ray tube display (CRT), a touchscreen, a tactile output device, a printer and/or speakers). The interface circuit 820 of the illustrated example, thus, typically includes a graphics driver card, a graphics driver chip or a graphics driver processor.

The interface circuit 820 of the illustrated example also includes a communication device such as a transmitter, a receiver, a transceiver, a modem and/or network interface card to facilitate exchange of data with external machines (e.g., computing devices of any kind) via a network 826 (e.g., an Ethernet connection, a digital subscriber line (DSL), a telephone line, coaxial cable, a cellular telephone system, etc.).

The processor platform 800 of the illustrated example also includes one or more mass storage devices 828 for storing software and/or data. Examples of such mass storage devices 828 include floppy disk drives, hard drive disks, compact disk drives, Blu-ray disk drives, RAID systems, and digital versatile disk (DVD) drives.

The coded instructions 832 of FIGS. 5 through 7 may be stored in the mass storage device 828, in the volatile memory 814, in the non-volatile memory 816, and/or on a removable tangible computer readable storage medium such as a CD or DVD.

From the foregoing, it will be appreciated that the above disclosed methods, apparatus and articles of manufacture enable participating devices to operate as both transmitter and receiver at any given instant. In addition, participating devices (e.g., devices 103 through 109 in FIG. 1A) can broadcast their availability for collaborative rendering during an RTSP session. The disclosed user interface (e.g., 150 in FIG. 1B) enables users to select specific content rendering capabilities offered by participating devices for enhanced user experience. Collaboration is configurable and policy based (based on codec capabilities, protocol compatibilities, security attributes, residual energy, etc.). As a part of the aforementioned collaboration, and based on user configuration, participating nodes perform partial content rendering and the partially rendered content is sent and received by nodes cooperatively and blended or composed locally at each node.

Example 1 is an apparatus for collaborative content rendering, the apparatus comprising, a capability determiner to determine, from a first device, rendering capabilities of one or more devices within a proximity to the first device, a device identifier that identifies at least one of the one or more devices that support a delivery of first content that is not natively supported by the first device, a content delivery initiator that initiates the delivery of the first content from the at least one of the one or more devices to the first device wherein an initiation of the delivery of the first content includes a negotiation of characteristics of content presentation and quality level of rendering capabilities, and a content renderer that renders the first content received from the one of the at least one or more devices at a same time as second content that is natively supported by the first device.

Example 2 includes the apparatus as defined in example 1, and further comprises a device capabilities forwarder that forwards data that characterizes capabilities of the first device to the one or more devices within the proximity to the first device, a request receiver that receives a request from at least one of the one or more devices for third content, and a content forwarder that forwards the third content to the at least one of the one or more devices.

Example 3 includes the apparatus as defined in example 1, wherein the content renderer renders content that is partially rendered remotely and content that is rendered locally together in a user configurable manner on a display of the first device.

Example 4 includes the apparatus as defined in example 1, wherein the negotiation includes identifying a subset of the one or more devices to provide the quality level of rendering capabilities.

Example 5 includes the apparatus as defined in example 1, wherein the negotiation is one of set to automatically occur periodically and to be disabled.

Example 6 includes the apparatus as defined in example 1, wherein the first device is a proxy device that renders the first content received from the one of the at least one or more devices at a same time as the second content and transmits the first and second content to a third device.

Example 7 includes the apparatus as defined in example 1, where the determining comprises using a communication protocol to discover natively unsupported digital rights management (DRM) rendering capabilities over a Miracast or other wireless many-to-one display connection.

Example 8 includes a method for collaborative content rendering, the method comprising, at a first device, determining capabilities of one or more devices within a proximity to the first device, identifying at least one of the one or more devices that support a delivery of first content that is not natively supported by the first device, from the first device, initiating the delivery of the first content from the at least one of the one or more devices to the first device wherein an initiation of the delivery of the first content includes a negotiation of characteristics of content presentation and quality level of rendering capabilities, and at the first device, rendering the first content received from the at least one of the one or more devices at the same time as second content that is natively supported by the first device.

Example 9 includes the method as defined in example 8, further comprising, from the first device, forwarding data that characterizes capabilities of the first device to the one or more devices within the proximity to the first device, receiving a request from at least one of the one or more devices for third content, and from the first device, forwarding the third content to the at least one of the one or more devices.

Example 10 includes the method as defined in example 8, wherein the rendering comprises a presentation of content partially rendered remotely and content rendered together in a user configurable manner on a display of the first device.

Example 11 includes the method as defined in example 8, wherein the negotiation includes identifying a subset of the one or more devices to provide the quality level of rendering capabilities.

Example 12 includes the method as defined in example 8, wherein the negotiation is one of set to automatically occur periodically and be disabled.

Example 13 includes the method as defined in example 8, wherein the first device is a proxy device that renders the first content received from the one of the at least one or more devices at a same time as the second content and transmits the first and second content to a third device.

Example 14 includes the method as defined in example 8, wherein the determining comprises using a communication protocol to discover natively unsupported DRM rendering capabilities over a Miracast or other wireless many-to-one display connection.

Example 15 includes a computer readable storage medium comprising instructions that, when executed, cause a machine to at least, at a first device, determine capabilities of one or more devices within a proximity to the first device, identify at least one of the one or more devices that support a delivery of first content that is not natively supported by the first device, from the first device, initiate the delivery of the first content from the at least one of the one or more devices to the first device wherein an initiation of the delivery of the first content includes a negotiation of characteristics of content presentation and quality level of rendering capabilities, and at the first device, render the first content received from the at least one of the one or more devices at the same time as second content that is natively supported by the first device.

Example 16 includes the computer readable storage medium as defined in example 15, and further comprising, from the first device, forward data that characterizes capabilities of the first device to the one or more devices within the proximity to the first device, receive a request from at least one of the one or more devices for third content, and from the first device, forward the third content to the at least one of the one or more devices.

Example 17 includes the computer readable storage medium as defined in example 15, wherein the rendering comprises rendering content partially rendered remotely and content rendered locally together in a user configurable manner on a display of the first device.

Example 18 includes the computer readable storage medium as defined in example 15, wherein the negotiation includes identifying a subset of the one or more devices to provide the quality level of rendering capabilities.

Example 19 includes the computer readable storage medium as defined in example 15, wherein the negotiation is one of set to automatically occur periodically and be disabled.

Example 20 includes the computer readable storage medium as defined in example 15, wherein the first device is a proxy device that renders the first content received from the one of the at least one or more devices at a same time as the second content and transmits the first and second content to a third device.

Example 21 includes a system for collaborative content rendering, the system comprising, means for determining the capabilities of one or more devices within a proximity to the first device, means for identifying at least one of the one or more devices that support a delivery of first content that is not natively supported by the first device, means for initiating the delivery of the first content from the at least one of the one or more devices to the first device wherein an initiation of the delivery of the first content includes a negotiation of characteristics of content presentation and quality level of rendering capabilities, and means for rendering the first content received from the at least one of the one or more devices at the same time as second content that is natively supported by the first device.

Example 22 includes the system as defined in example 21, further comprising, means for forwarding data that characterizes capabilities of the first device to the one or more devices within the proximity to the first device, means for receiving a request from at least one of the one or more devices for third content, and means for forwarding the third content to the at least one of the one or more devices.

Example 23 includes the system as defined in example 21, wherein the rendering comprises rendering content partially rendered remotely and content rendered locally together in a user configurable manner on a display of the first device.

Example 24 includes the system as defined in example 21, wherein the negotiation includes identifying a subset of the one or more devices to provide the quality level of rendering capabilities.

Example 25 includes the system as defined in example 21, wherein the negotiation is one of set to automatically occur periodically and be disabled.

Example 26 includes the system as defined in example 21, the first device is a proxy device that renders the first content received from the one of the at least one or more devices at a same time as the second content and transmits the first and second content to a third device.

Example 27 includes the system as defined in example 21, wherein the determining comprises using a communication protocol to discover natively unsupported DRM rendering capabilities over a Miracast or other wireless many-to-one display connection.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. A first device for collaborative content rendering, the first device comprising:
   a display;
   a capability determiner to determine media capabilities of one or more devices within a proximity to the first device;
   a device identifier to identify, based on the determined media capabilities, at least one of the one or more devices that support a delivery of first content that is natively unsupported by the first device;
   a content delivery initiator to initiate delivery of the first content from the at least one of the one or more devices to the first device, the initiation of the delivery of the first content to include a negotiation of characteristics of content presentation and quality level of rendering capabilities; and
a content renderer to:
render the first content received from the one of the at least one or more devices;
render second content that is natively supported by the first device; and
present the rendered first and second content compositely and simultaneously on the display of the first device.

2. The first device of claim 1, further including:
a device capabilities forwarder to forward data that characterizes capabilities of the first device to the one or more devices within the proximity to the first device;
a request receiver to receive a request from at least one of the one or more devices for third content that is natively supported by the first device; and
a content forwarder to forward the third content to the at least one of the one or more devices in response to the request.

3. The first device of claim 1, wherein the first content is to be partially rendered remotely from the first device prior to being delivered to and rendered locally by the content renderer at the first device.

4. The first device of claim 1, wherein the content delivery initiator is to identify a subset of the one or more devices to provide the quality level of rendering capabilities.

5. The first device of claim 1, wherein the content delivery initiator is to automatically initiate the negotiation periodically.

6. The first device of claim 1, wherein the capability determiner is to determine the media capabilities of the one or more devices using a communication protocol to discover natively unsupported digital rights management (DRM) rendering capabilities over a Miracast or other wireless many-to-one display connection.

7. The first device of claim 1, wherein the content delivery initiator is to initiate the delivery of the first content in response to a user input received at a user interface of the first device, the user interface providing a user input back channel to facilitate the initiation of the delivery of the first content.

8. A method for collaborative content rendering, the method comprising:
determining, by executing an instruction with a processor of a first device, media capabilities of one or more devices within a proximity to the first device;
based on the determined media capabilities, identifying, by executing an instruction with the processor, at least one of the one or more devices that support a delivery of first content that is natively unsupported by the first device;
initiating, by executing an instruction with the processor, the delivery of the first content from the at least one of the one or more devices to the first device, the initiating including a negotiation of characteristics of content presentation and quality level of rendering capabilities;
rendering, at the first device, the first content received from the at least one of the one or more devices;
rendering, at the first device, second content that is natively supported by the first device; and
presenting the rendered first and second content compositely and simultaneously on a display of the first device.

9. The method of claim 8, further including:
forwarding data that characterizes capabilities of the first device from the first device to the one or more devices within the proximity to the first device;
receiving a request from at least one of the one or more devices for third content that is natively supported by the first device; and
in response to the request, forwarding the third content from the first device to the at least one of the one or more devices.

10. The method of claim 8, wherein the first content is partially rendered remotely from the first device prior to being delivered to and rendered locally at the first device.

11. The method of claim 8, wherein the negotiation includes identifying a subset of the one or more devices to provide the quality level of rendering capabilities.

12. The method of claim 8, wherein the negotiation automatically initiated periodically.

13. The method of claim 8, wherein the determining includes using a communication protocol to discover natively unsupported DRM rendering capabilities over a Miracast or other wireless many-to-one display connection.

14. The method of claim 8, wherein the initiating of the delivery of the first content is in response to a user input received at a user interface of the first device, the user interface to provide a user input back channel to facilitate the initiation of the delivery of the first content.

15. A computer readable storage medium comprising instructions that, when executed, cause a first device to at least:
determine media capabilities of one or more devices within a proximity to the first device;
identify, based on the determined media capabilities, at least one of the one or more devices that support a delivery of first content that is natively unsupported by the first device;
initiate the delivery of the first content from the at least one of the one or more devices to the first device, the initiating including a negotiation of characteristics of content presentation and quality level of rendering capabilities;
render the first content received from the at least one of the one or more devices;
render second content that is natively supported by the first device; and
present the rendered first and second content compositely and simultaneously on a display of the first device.

16. The computer readable storage medium of claim 15, wherein the instructions, when executed, further cause the first device to:
forward data that characterizes capabilities of the first device to the one or more devices within the proximity to the first device;
receive a request from at least one of the one or more devices for third content that is natively supported by the first device; and
in response to the request, forward the third content to the at least one of the one or more devices.

17. The computer readable storage medium of claim 15, wherein the first content is partially rendered remotely from the first device prior to being delivered to and rendered locally at the first device.

18. The computer readable storage medium of claim 15, wherein the negotiation includes identifying a subset of the one or more devices to provide the quality level of rendering capabilities.

19. The computer readable storage medium of claim 15, wherein the negotiation is automatically initiated periodically.

20. The computer readable storage medium of claim 15, wherein the instructions, when executed, cause the first device to initiate the delivery of the first content in response to a user input received at a user interface of the first device, the user interface to provide a user input back channel to facilitate the initiation of the delivery of the first content.

* * * * *